Dec. 24, 1935.       C. H. M. FRY        2,025,162
MULTICYLINDER INTERNAL COMBUSTION ENGINE
Filed Feb. 18, 1931      2 Sheets-Sheet 1

Inventor
Chas. H. M. Fry
By R. H. Stockman
Attorney

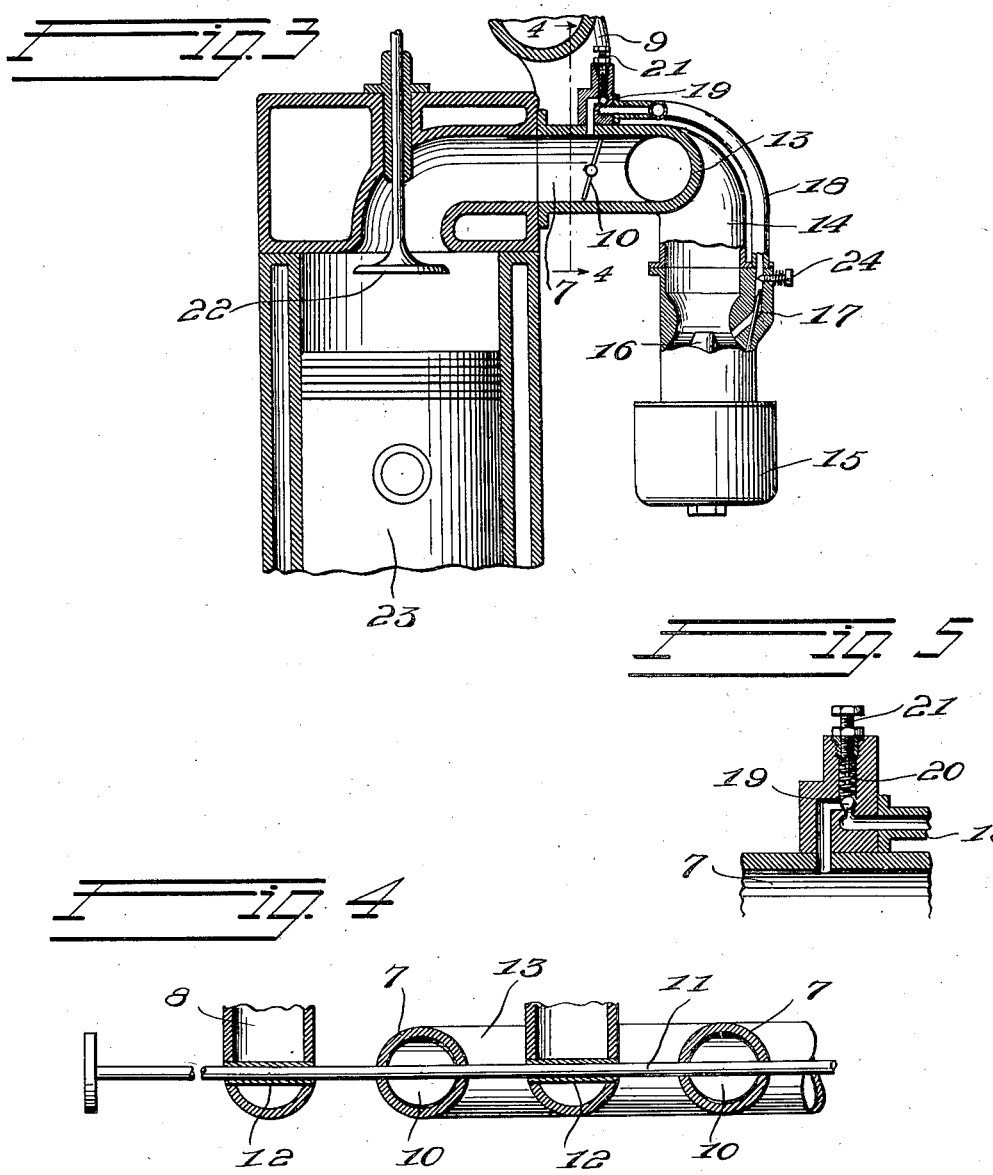

Patented Dec. 24, 1935

2,025,162

UNITED STATES PATENT OFFICE 2,025,162

MULTICYLINDER INTERNAL COMBUSTION ENGINE

Charles H. M. Fry, Point Pleasant, W. Va.

Application February 18, 1931, Serial No. 516,803

5 Claims. (Cl. 123—52)

This invention relates to improvements in internal combustion engines, and more particularly to a novel multicylinder engine.

The means which I have incorporated in a multi-cylinder internal combustion engine relieves the negative load on the engine, which load is caused by the minus pressure in the intake manifold, due to the usual method of throttling the explosive mixture at the carburetor in order to reduce the power output of the engine.

In a four-cylinder, four-cycle engine, the intake valves are so timed that the admission periods overlap, causing a continuous minus pressure in the intake manifold, and in a six-cylinder engine, this effect is much more noticeable, due to the overlapping of the intake strokes. This continuous minus pressure requires a large percentage of the total power of an automobile engine when the car is operated on level roads at moderate speeds.

The primary object of the invention is to provide means whereby the explosive mixture is fed to the cylinders at relatively high pressure, the pressure being reduced only at the end of the admission stroke. This is accomplished mainly by arranging a throttle valve in the intake port of each cylinder. The mixture flowing to the cylinders passes by these valves directly into the cylinders, but as the admission valve of each cylinder is open only during the admission stroke, the pressure in the intake port rises to approximately atmospheric before the admission valve opens. This allows the piston to descend on the admission stroke free and unretarded by the minus pressure which is always present with the usual form of throttle control.

Another object is to provide means whereby a low speed carburetor jet is arranged to conform with the invention, the passageways leading from the jet to the various cylinders, each containing a spring pressed check valve to prevent mixture from the jet travelling reversely from the intake port of a cylinder to the intake port of another cylinder.

With the foregoing objects outlined and with other objects in view which will appear as the description proceeds, the invention consists in the novel features hereinafter described in detail, illustrated in the accompanying drawings, and more particularly pointed out in the appended claims.

Referring to the drawings,

Fig. 3 is a transverse vertical sectional view of a portion of the intake.

Fig. 4 is a sectional view of a detail.

Fig. 5 is an enlarged sectional view of another detail.

Figure 1:
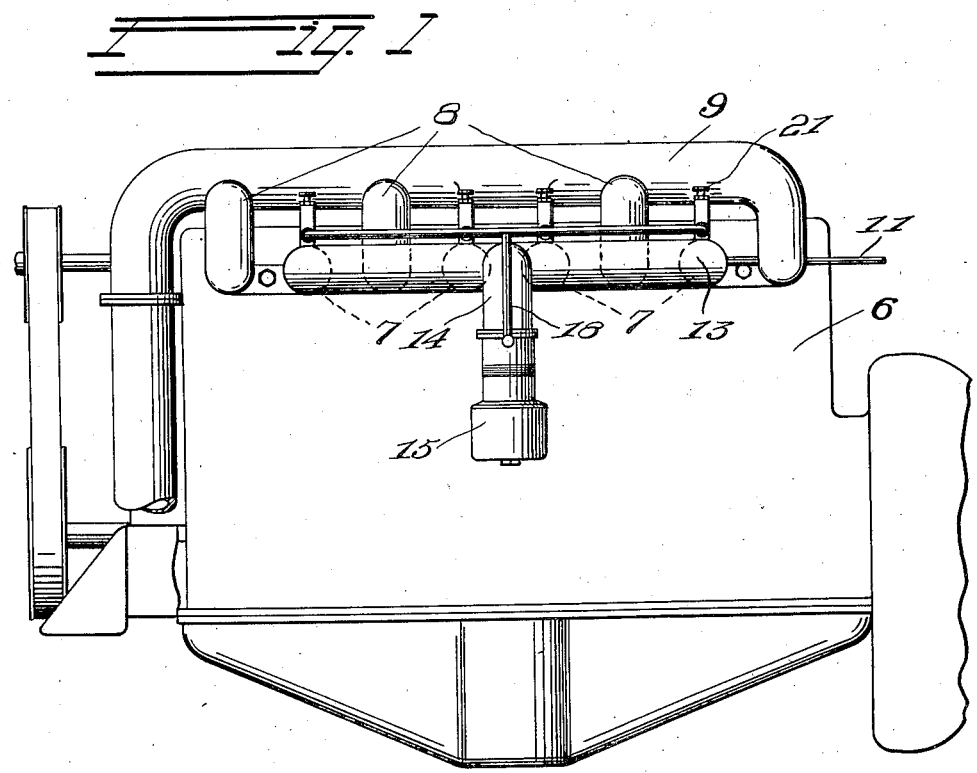
Fig. 1 is a side elevation of a multi-cylinder engine equipped with my improvements.
Figure 2:
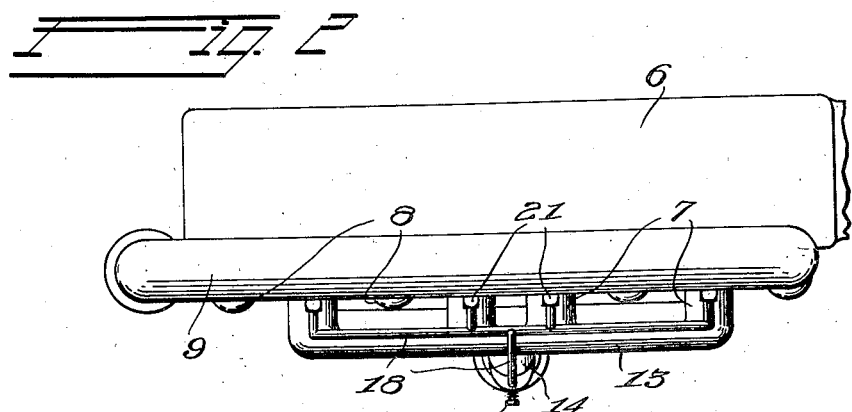
Fig. 2 is a top plan view of the same.

In the drawings, 6 designates the block of a multi-cylinder engine having the intake ports 7 and exhaust ports 8. The exhaust ports lead to the conventional exhaust pipe 9.

From Figs. 3 and 4 it will be noted that the intake port of each cylinder is provided with a throttle valve 10 which may be of the butterfly type. All of these valves are operated in unison by any suitable means. For example, the valves may be all fixed to a rock shaft 11 that may be turned by any suitable mechanism which the operator can control from the interior of the automobile. Where the shaft 11 extends through the exhaust ports, it is surrounded by tubes or sleeves 12 which have their ends secured to the walls of the ports by gas-tight joints.

All of the intake ports communicate with a common intake manifold 13 that is connected by a drop leg 14 to any suitable type of carburetor 15. The carburetor may be of the double jet type, that is, one having a high speed jet 16, and a low speed jet 17; and branch pipes 18 will lead from the low speed jet to each of the intake ports posterior to the valves 10. Each passageway is provided with a suitable check valve such as a ball 19 that is held to seat by a spring 20 which may be adjusted by means of a screw 21. The check valves allow the explosive mixture to flow from the jet 17 to any one of the intake ports 7, but they prevent any return flow from one port to another.

Each cylinder has a conventional admission valve 22 and an exhaust valve, not shown.

In operation, the means described causes the explosive mixture to be fed to the cylinders at relatively high pressure, the pressure being reduced only at the end of the admission stroke, this being accomplished through the instrumentality of the throttle valves 10, the mixture being fed constantly past these valves into the intake ports 7, but as the admission valve 22 of each cylinder is opened only during the admission stroke, the pressure in the ports 7 rises to approximately atmospheric, before the admission valve 22 opens. This allows the piston 23 to start down on the admission stroke free and unretarded by the minus pressure which is always present with the conventional form of throttle control.

In high speed operation, the carburetor 15 functions in the conventional manner, and when the power output is to be reduced, the valves 10 are partly closed, and assume the position shown in Fig. 3. Then, due to the partial vacuum created in the intake ports 7, the low speed jet 17 is brought into operation. Consequently, the fuel is sucked through the venturi of the carburetor and is mixed with air and passed by the hand controlled regulating valve 24, and is conducted by the tube 18 to the equalizing or check valve 19. From this valve, it passes into the intake ports 7. The amount of fuel fed is regulated by the valve 24, the valve 19 functioning to equalize the distribution of the fuel to the individual cylinders of the engine.

There will be a tendency for the gas in the intake port 7 of one cylinder to flow back past the equalizing valve 19 when this cylinder's admission valve 22 is closed and the pressure in 7 is equal to that in the manifold 13. It would of course flow into the intake port 7 of another cylinder that was drawing gas on its admission stroke, but the check valves 19 will prevent this.

In the usual types of engines, where the gas is throttled at the carburetor, as its temperature is immediately lowered due to the refrigerating effect of expansion of the gas, it is necessary to heat the gas to a relatively high temperature in order to completely vaporize the fuel before it enters the engine cylinders. In my device, as the throttle valves are placed at the ports leading to the engine cylinders, the gas in the manifold remains at approximately atmospheric pressure and temperature. Therefore, only a small amount of heat is necessary to vaporize the fuel.

Also, as the valves 10 are always open a slight amount, they admit gas from the intake manifold 13 into the ports 7, and consequently keep the gas in a constant state of agitation or turbulence. Manifestly, the tendency of the fuel to precipitate will be lessened if not stopped altogether.

From the foregoing it is believed that the construction, operation and advantages of the invention may be readily understood by those skilled in the art, and I am aware that changes may be made in the details disclosed, without departing from the spirit of the invention, as expressed in the claims.

What I claim and desire to secure by Letters Patent is:

1. An internal combustion engine comprising a plurality of cylinders, each cylinder having an intake port, an admission valve for controlling said port, a throttle valve in each port, a carburetor for furnishing a mixture of air and fuel to all of said ports, a conduit placing the outlet of the carburetor in communication with all of said ports for leading the mixture from the carburetor to each of said ports, means for simultaneously actuating all of said throttle valves, said carburetor having an auxiliary low speed jet, auxiliary passageways placing said jet in communication with each of said ports posterior to the throttle valve of that port for trapping fuel and air mixture in the respective ports between the admission valves and throttle valves while the admission valves thereof remain closed, and a common regulating valve for said passageways.

2. An internal combustion engine comprising a plurality of cylinders, each cylinder having an intake port, an admission valve for controlling said port, a throttle valve in each port, a carburetor for furnishing a mixture of air and fuel to all of said ports, a conduit placing the outlet of the carburetor in communication with all of said ports for leading the mixture from the carburetor to each of said ports, means for simultaneously actuating all of said throttle valves, said carburetor having an auxiliary low speed jet, auxiliary passageways placing said jet in communication with said ports posterior to the throttle valves for trapping fuel and air mixture in the respective ports between the admission valves and throttle valves while the admission valves thereof remain closed, and a check valve for each passageway arranged adjacent to the outlet of the latter to prevent an explosive mixture from flowing through the passageways from one intake port to another.

3. An internal combustion engine having a plurality of cylinders each provided with a piston, an intake port and an admission valve for each port, a throttle valve in each port spaced from the admission valve, means for simultaneously operating all of said throttle valves, a carbureter, conduit means from the carbureter to supply fuel mixture to all of said ports past the throttle valves therein, and auxiliary conduit means for the supply of fuel mixture of the same degree of richness as supplied through said first mentioned conduit means to each port between the throttle valve therein and the associated admission valve while the latter is closed during operation of the engine primarily with the fuel mixture passing through the first mentioned conduit means, whereby both conduit means are simultaneously subject to the suction of the engine, and fuel mixture supplied through the auxiliary conduit means is trapped between the throttle valve and associated admission valve in each port so that pressure of the mixture in each port will be substantially atmospheric and will relieve the negative load on the engine when the respective pistons descend.

4. An internal combustion engine according to claim 3 wherein both conduit means lead from the same mixing chamber of the carbureter.

5. An internal combustion engine according to claim 3 having check valves in the auxiliary conduit means preventing return of fuel mixture to the carbureter and flow thereof from one port to another.

CHARLES H. M. FRY.